US011956229B2

(12) United States Patent
Wagner

(10) Patent No.: US 11,956,229 B2
(45) Date of Patent: *Apr. 9, 2024

(54) MULTI-FACTOR AUTHENTICATION USING CUSTOMIZABLE PHYSICAL SECURITY TOKEN

(71) Applicant: Capital One Services, LLC, McLean, VA (US)

(72) Inventor: Jerry Wagner, Chesterfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,694

(22) Filed: May 8, 2023

(65) Prior Publication Data

US 2023/0275890 A1 Aug. 31, 2023

Related U.S. Application Data

(63) Continuation of application No. 17/134,842, filed on Dec. 28, 2020, now Pat. No. 11,647,016.

(51) Int. Cl.
*H04L 29/06* (2006.01)
*G06F 21/36* (2013.01)
*H04L 9/40* (2022.01)

(52) U.S. Cl.
CPC .......... *H04L 63/083* (2013.01); *G06F 21/36* (2013.01); *H04L 63/0435* (2013.01); *H04L 63/102* (2013.01); *H04L 63/20* (2013.01); *H04L 2463/082* (2013.01)

(58) Field of Classification Search
CPC . H04L 63/083; H04L 63/0435; H04L 63/102; H04L 63/20; H04L 2463/082; G06F 21/36
See application file for complete search history.

(56) References Cited

U.S. PATENT DOCUMENTS 8,881,251 B1 * 11/2014 Hilger ................... H04L 63/083
726/19
9,237,145 B2 * 1/2016 Sondhi ............... H04L 63/0853
9,762,581 B1 * 9/2017 Wang .................... H04L 63/102
(Continued)

OTHER PUBLICATIONS

Eminagaoglu et al., "A Two-Factor Authentication System with QR Codes for Web and Mobile Applications," 2014 Fifth International Conference on Emerging Security Technologies, 2014, pp. 105-112, doi: 10.1109/EST.2014.19. (Year: 2014).

*Primary Examiner* — Khalid M Almaghayreh
(74) *Attorney, Agent, or Firm* — Harrity & Harrity, LLP

(57) ABSTRACT

In some implementations, an authentication system may receive, from a client device, a credential associated with a user account and a request to access a resource. The authentication system may transmit, to the client device, a request for an image of a customized physical security token associated with the user account. The authentication system may receive, from the client device, a first image. The authentication system may compare the first image with a representation of a second image of the customized physical security token associated with the user account. The authentication system may grant or denying access to the resource based on comparing the first image with the representation of the second image.

20 Claims, 7 Drawing Sheets

(56) References Cited

U.S. PATENT DOCUMENTS

| | | | |
|---|---|---|---|
| 11,647,016 B2 | 5/2023 | Wagner | |
| 2004/0002894 A1* | 1/2004 | Kocher | G07C 9/28 |
| | | | 705/13 |
| 2005/0182927 A1* | 8/2005 | Shatford | G07F 7/1008 |
| | | | 713/159 |
| 2006/0174339 A1* | 8/2006 | Tao | G06F 21/36 |
| | | | 726/18 |
| 2008/0098464 A1* | 4/2008 | Mizrah | G06F 21/36 |
| | | | 726/5 |
| 2016/0283709 A1* | 9/2016 | Potnuru | G06F 21/6209 |
| 2017/0046894 A1* | 2/2017 | Robinson | G07C 9/00174 |
| 2017/0116588 A1* | 4/2017 | Conant | G06Q 20/4016 |
| 2020/0007536 A1* | 1/2020 | Piel | G06Q 20/401 |
| 2020/0106777 A1* | 4/2020 | Hu | G06F 21/43 |
| 2020/0226407 A1* | 7/2020 | Kendrick | G06N 20/00 |
| 2020/0334930 A1* | 10/2020 | Masood | G07C 9/257 |
| 2020/0387594 A1* | 12/2020 | Sandstrom | G06F 21/316 |
| 2021/0295694 A1* | 9/2021 | Vallance | G06V 20/54 |
| 2022/0014509 A1* | 1/2022 | Walters | H04L 63/0876 |
| 2022/0131850 A1* | 4/2022 | Zhu | H04L 63/0876 |

\* cited by examiner

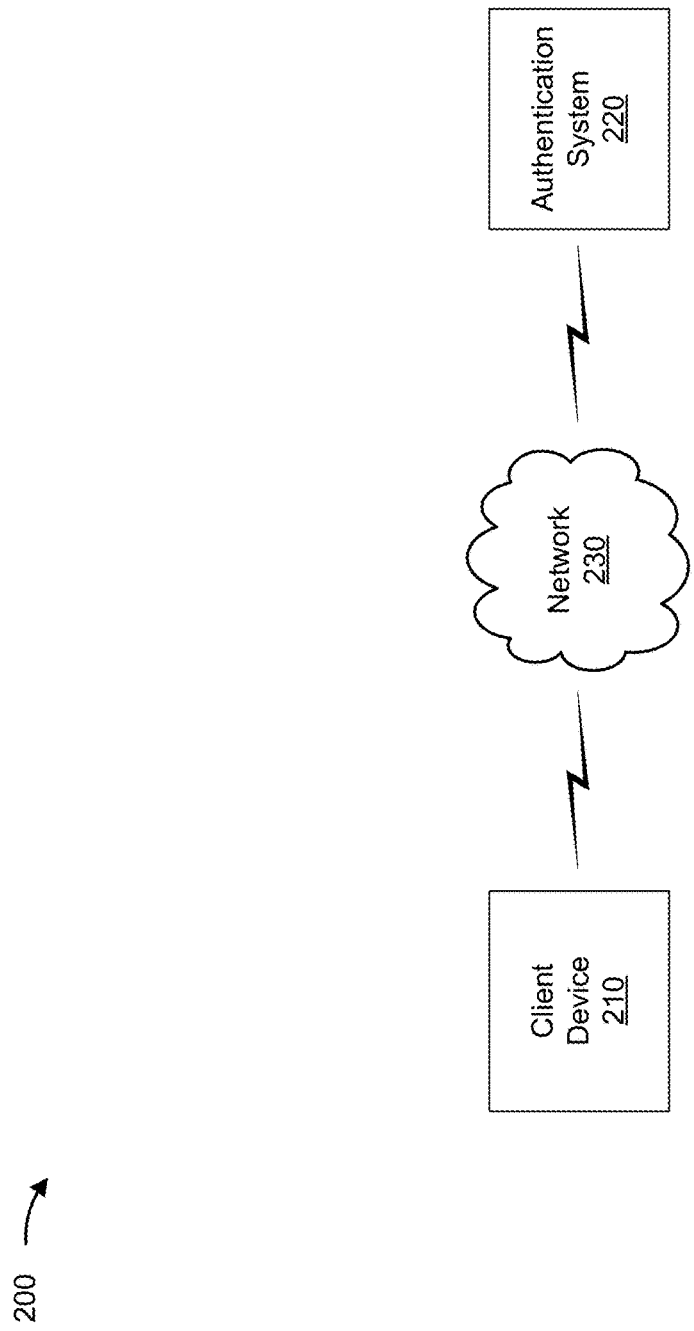

MULTI-FACTOR AUTHENTICATION USING CUSTOMIZABLE PHYSICAL SECURITY TOKEN

RELATED APPLICATION

This application is a continuation of U.S. patent application Ser. No. 17/134,842, filed Dec. 28, 2020 (now U.S. Pat. No. 11,647,016), which is incorporated herein by reference in its entirety.

BACKGROUND

Multi-factor authentication (MFA) is an authentication technique in which a user of a computing device is granted access to a resource (e.g., a computing resource, a network resource, or an application) only after successfully proving two or more factors to an authentication service. The two or more factors may include knowledge (e.g., something only the user knows), possession (e.g., something only the user has), and/or inherence (e.g., something only the user is).

SUMMARY

In some implementations, a system for authenticating a user for access to a network resource using multi-factor authentication includes one or more memories and one or more processors, communicatively coupled to the one or more memories, configured to: receive, from a client device, a login credential and a request to access the network resource; receive, from the client device, an image of a customizable physical security token; compare the image of the customizable physical security token with authentication information relating to a customization of the customizable physical security token associated with the login credential; and grant or deny access to the network resource based on comparing the image of the customizable physical security token with the authentication information.

In some implementations, a method for multi-factor authentication includes receiving, from a client device, a credential associated with a user account and a request to access a resource; transmitting, to the client device, a request for an image of a customized physical security token associated with the user account; receiving, from the client device, a first image; comparing the first image with a representation of a second image of the customized physical security token associated with the user account; and granting or denying access to the resource based on comparing the first image with the representation of the second image.

In some implementations, a non-transitory computer-readable medium storing a set of instructions includes one or more instructions that, when executed by one or more processors of a client device, cause the client device to: transmit, to a server device, a request to access a network resource; receive, from the server device and based on transmitting the request, a request for multi-factor authentication using a customizable physical security token; transmit, to the server device, an image of the customizable physical security token, wherein the customizable physical security token includes a grid having slots with customizable visual attributes; and receive, from the server device, a message indicating whether the access to the network resource is granted or denied based on transmitting the image of the customizable physical security token.

BRIEF DESCRIPTION OF THE DRAWINGS

FIG. 2 is a diagram of an example environment in which systems and/or methods described herein may be implemented.

DETAILED DESCRIPTION

Figure 1A:
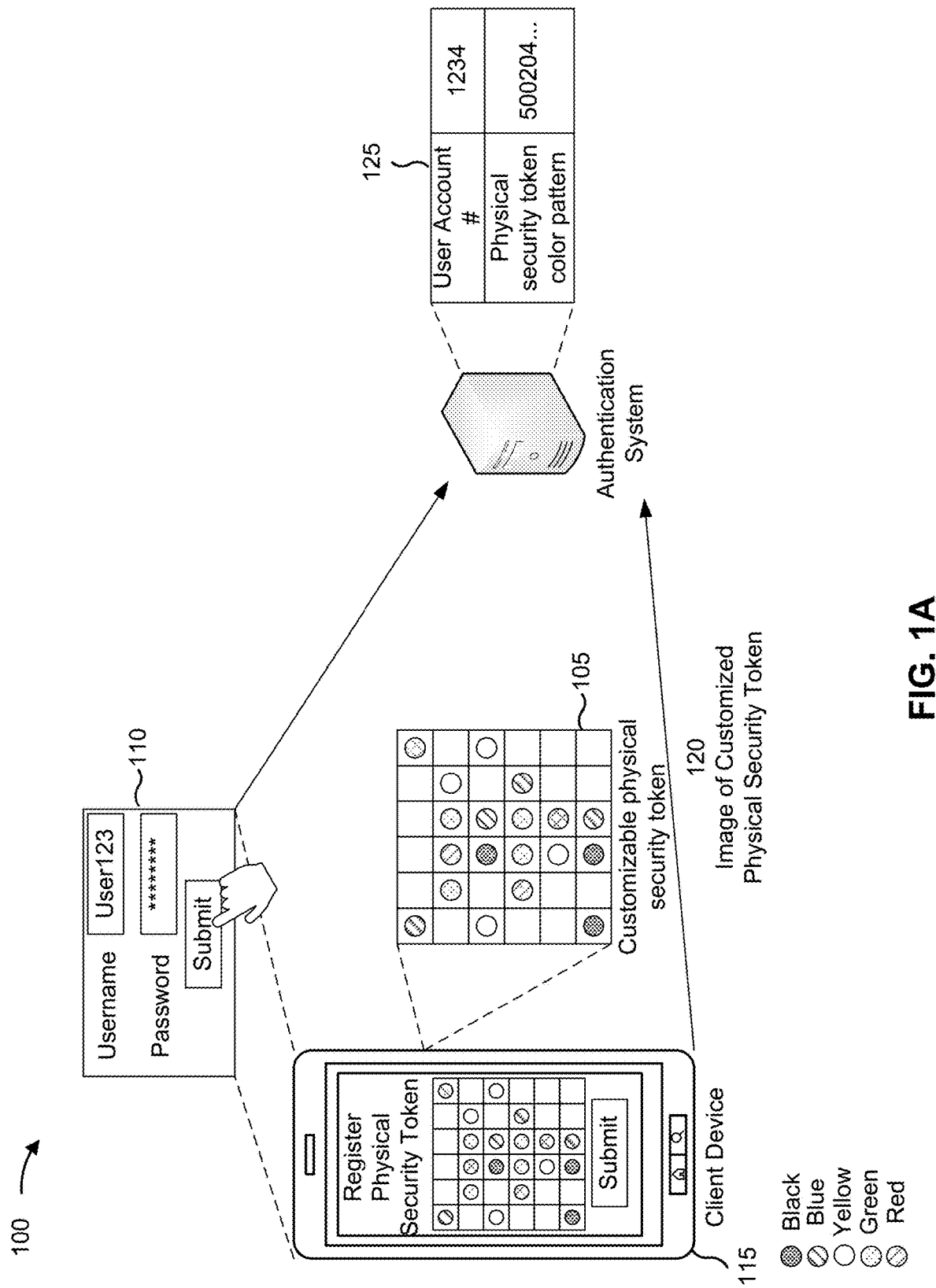
FIGS. 1A-1C are diagrams of an example implementation relating to multi-factor authentication using a customizable physical security token.

The following detailed description of example implementations refers to the accompanying drawings. The same reference numbers in different drawings may identify the same or similar elements.

Short Message Service One-Time Password (SMS OTP) is a type of multi-factor authentication (MFA) used to verify a user's identity to determine whether to grant a computing device, associated with the user, access to a network resource. SMS OTP typically involves sending a numerical passcode, that is valid for only a short time, to a secondary contact point (e.g., a smartphone) that is known to be owned by the user. The user subsequently enters the numerical passcode into a prompt on the computing device on which the user initially requested access to the network resource. However, such SMS messages can be spoofed, and the numerical passcodes may be subject to "man-in-the-middle" attacks, in which a malicious person calls the user and manipulates the user to read the numerical passcode over the phone. More advanced MFA techniques, including MFA using hardware authentication devices, such as YubiKeys, and/or software-based authenticator applications, may provide increased security as compared with SMS OTP. However, such advanced authentication techniques may be difficult to use correctly for many users, particularly for technologically unsophisticated users. Furthermore, such advanced authentication techniques may consume significant computing resources (e.g., processing resources, memory resources, and/or communication resources) and/or networking resources.

Some implementations described herein enable MFA using a user-customizable physical security token. The customizable physical security token may be simple to customize and use for MFA, even for non-technical savvy users. For example, the customizable physical token may include a grid in which a user can place objects with different visual attributes to customize the physical security token for that user. A user device may capture an initial image of the customized physical security token and send the image to an authentication system. The authentication system may store a representation of the initial image of the customized physical security token. When performing MFA, the authentication system may request an image of the customized physical token. The user device may capture another image of the customized physical token and transmit the image to the authentication system. The authentication may compare the image with the representation of the initial image and determine an authentication result based on the comparison. As a result, MFA can be provided using a customizable physical security token, without using complicated MFA techniques, such as hardware authentication devices or software-based authenticator applications, that may be difficult for users to use correctly. Furthermore, the image of the customizable physical security token is difficult to replicate by adverse parties and/or describe verbally by the user. Accordingly, vulnerability of MFA to spoofing and/or man-in-the-middle attacks may be reduced, thereby enhancing security for the user. In addition, MFA using a customizable physical security token may conserved computing resources (e.g., processing resources, memory resources, and/or communication resources) and/or networking resources, as compared to complicated MFA techniques, such as hardware authentication devices or software-based authenticator applications.

Figure 1B:
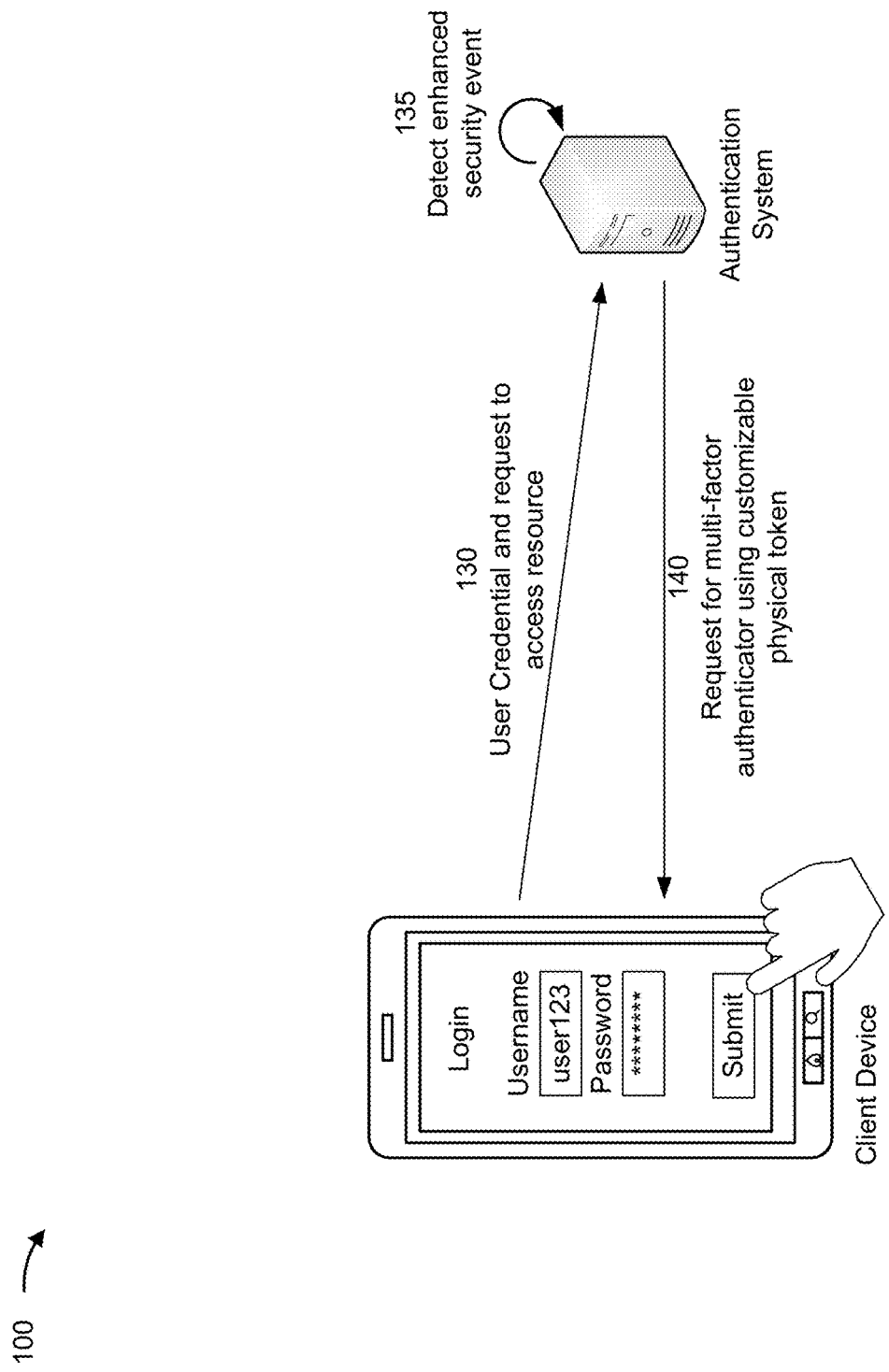
Figure 1C:
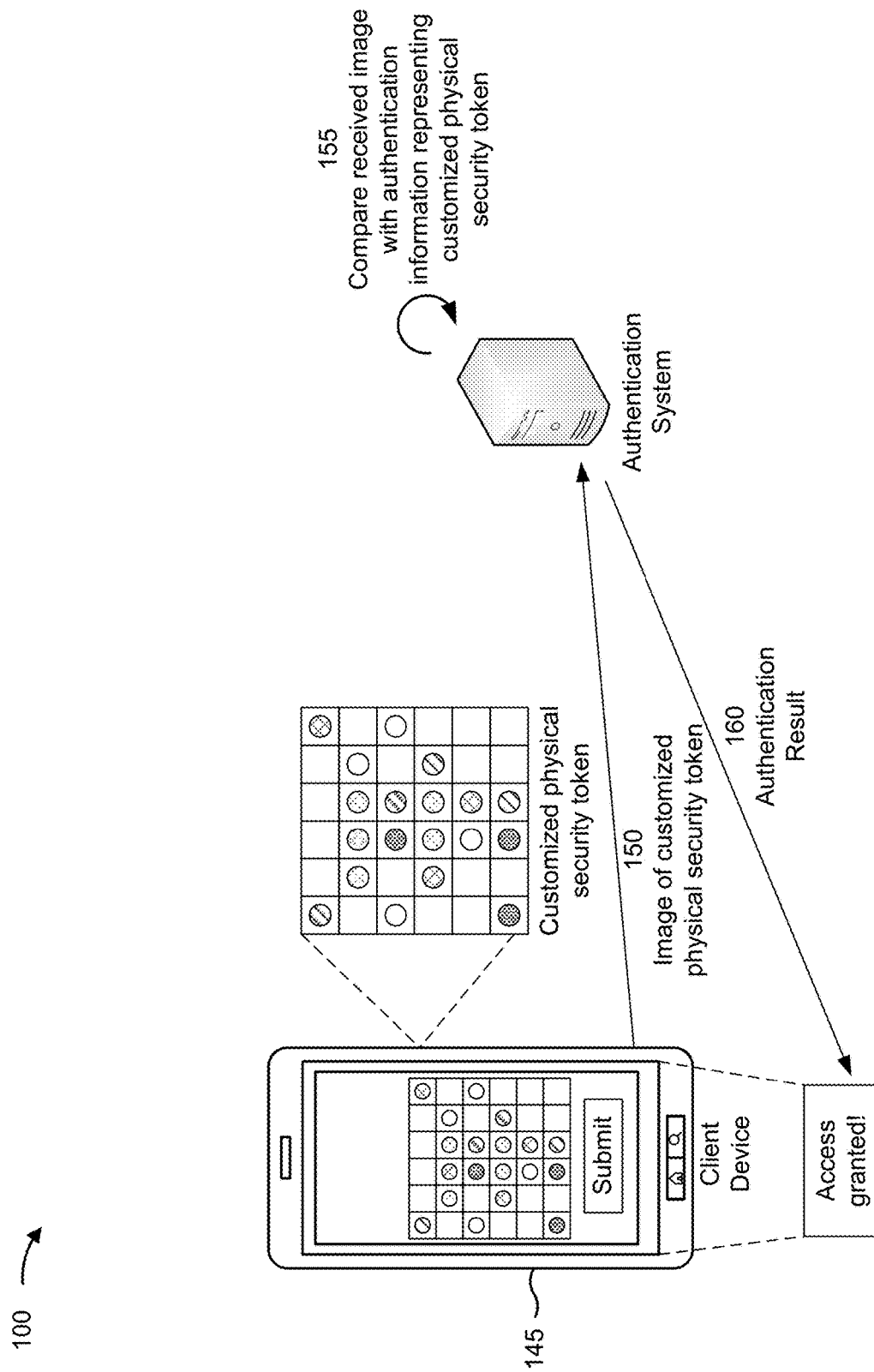

FIGS. 1A-1C are diagrams of an example 100 associated with MFA authentication using a customizable physical security token. As shown in FIGS. 1A-1C, example 100 includes a user device and an authentication system. These devices are described in more detail in connection with FIGS. 2 and 3.

As shown in FIG. 1A, and by reference number 105, a user may customize a customizable physical security token. The customizable physical security token may be a physical object having multiple portions with customizable visual attributes. The user may customize the customizable physical security token by selecting visual aspects for the portions of the customizable physical security token to set a customized visual attribute pattern for the customizable physical security token.

As shown in FIG. 1A, in some implementations, the customizable physical security token may include a grid that includes a plurality of slots with customizable visual attributes. For example, the grid may be a square or rectangular grid. The customizable physical security token may also include objects, such as beads, cubes, or discs, among other examples, that can be accommodated in one or more slots of the plurality of slots to customize the visual attributes for the slots. The objects may have various visual attributes, such as color, shape, shading, pattern, or size, among other examples. As shown in example 100, the objects may be beads of various colors (e.g., black, blue, yellow, green, or red). In this case, the user may customize the customizable physical security token by selecting colored beads to be accommodated in all or a subset of the plurality of slots in the grid. For example, for each slot in the grid, the user may place a bead of a certain color in that slot, or the user may leave that slot empty. Empty slots may be considered to be slots having a default or background color (e.g., white). In this way, the user may customize a color pattern for the customizable physical security token. The customized physical security token may include a locking mechanism that locks the customized color pattern in place. For example, the user may apply an adhesive layer to hold the beads in the slots of the customizable physical security token. Additionally, or alternatively, the physical security token may include a transparent cover, which may be closed and locked by the user to hold the beads in place in the slots.

As shown in example 100, the grid may be a 6×6 grid having 36 slots. As shown in example 100, the user may select one of six color options for each slot (e.g., black, blue, yellow, green, red, or empty/white), resulting in over one billion possible permutations for the 6×6 grid. The customization, by the user, of a customizable physical security token having such a large number of possible permutations makes the customized color pattern selected by the user difficult to replicate. In some implementations, the grid size, quantity of colors available for each slot, and/or selection of colors available for each slot may differ from those shown in example 100. For example, the grid size may be decreased for simpler customization, or the grid size and/or the quantity of colors may be increased to increase the number of possible permutations for increased security.

In some implementations, the customizable physical security token may be equipped with mechanical controls, such as push buttons, that control the visual attribute selection for the slots of the customizable physical security token. For example, rotatable objects, such as a cube, with faces having different colors may be accommodated in the slots, and the mechanical controls may control the rotation of the rotatable objects. In this case, the user may customize the color pattern by using the mechanical controls to rotate the rotatable objects in order to select a respective color for each slot.

In some implementations, the customizable physical security token may have a shape other than a square or rectangular grid. For example, the customizable physical security token may have a circular shape, another geometric shape, or a shape that is customizable by the user. In this case, the customizable physical security token may include slots with customizable visual attributes, and the slots may be arranged in a grid pattern or another pattern (e.g., concentric circles) within the shape of the customizable physical security token.

In some implementations, the user may customize the customizable physical security token by selecting visual attributes for the customizable physical security token using the client device, and the resulting customized physical security token may be generated based on the user customization. For example, the client device may control a 3D printer to generate the customized physical security token. In this case, the client device may provide a user interface, and the user may interact with the user interface to customize the physical security token. In some implementations, an image of the customized physical security token may be displayed on a portable card (e.g., similar in size and shape to a credit card).

As further shown in FIG. 1A, and by reference number 110, the client device may transmit, to the authentication system, account information associated with a network resource. The user may input the account information to the client device via an input component of the client device. In some implementations, the account information may include account information for establishing an account associated with the network resource. The account information may include a user credential associated with the user. The user credential may include a username and a password associated with the user. In some implementations, the account information may also include contact information, such as an email address, a telephone number, and/or an address, among other examples, for the user. In some implementations, the account information may be associated with a financial account, such as a checking account, a savings account, or a credit card account, for the user.

In some implementations, the network resource may include a computing resource (e.g., a server device, a cloud computing device, and/or a network device), a software resource (e.g., an application, a computer program, and/or a website), a financial account (e.g., a credit card account, a checking account, or a savings account), an account associated with an intranet, and/or a resource that enables modification to an account (e.g., a user account or a financial account), among other examples. The authentication system may be associated with an entity, such as a financial institution (e.g., a bank, a retail bank, an investment bank, and/or a credit card company), an online retailer, or a gaming entity, and may store and/or manage the account information associated with the user.

As further shown in FIG. 1A, and by reference number 115, the client device may capture an image of the customized physical security token. For example, the client device may capture an image of the customized physical security token using a camera of the client device. In some implementations, the authentication system may transmit, to the client device, a request to register a physical security token, and the client device may capture the image of the customized physical security token based on receiving the request to register the physical security token. For example, the authentication system may transmit the request to register the physical security token based on receiving the account information establishing the user account associated with the network resource. As shown by reference number 120, the client device may transmit, to the authentication system, the image of the customized physical security token.

As further shown in FIG. 1A, and by reference number 125, the authentication system may store authentication information relating to the customized physical security token. The authentication information may include a representation of the image of the customized physical security token. The authentication system may store the authentication information relating to the customize physical security token in a data structure with an account number (or other account identifier) associated with the user account, and/or other account information, such as the user credential and/or a device identifier for a device associated with the user account, among other examples.

In some implementations, the authentication information may include a numerical representation of the visual attribute pattern in the image of the customized physical security token. For example, the authentication system may generate a numerical sequence representing the customized color pattern for the slots of the customized physical security token based on the image of the customized physical security token. In this case, various colors may be associated with corresponding numbers. The authentication system may detect a respective color for each slot based on pixel values associated with each slot in the image, and the authentication system may generate the numerical sequence, of which each digit represents the color of a respective slot of the customized physical security token. In some implementations, the authentication information may include the image of the customized physical security token. For example, the authentication system may store the image of the customized physical security token, in addition to or instead of the numerical sequence.

In some implementations, the authentication system may perform one or more image processing operations on the image of the customized physical security token prior to generating the numerical sequence and/or storing the image. For example, the authentication system may perform object detection (e.g., machine learning-based object detection) to detect the customized physical security token in the image. The authentication system may perform image processing operations to crop the image, re-size all or a portion of the image, rotate all or a portion of the image, and/or re-align (e.g., center) a portion of the image, based on the detected customized physical security token in the image. Additionally, or alternatively, the authentication system may perform one or more image processing operations to adjust the pixel values in all or a portion of the image. For example, the authentication system may normalize the pixel values in the image based on the range of pixel values.

As shown in FIG. 1B, and by reference number 130, at a time subsequent to the authentication system storing the authentication information, the client device may transmit, to the authentication system, the user credential associated with the user and a request to access the network resource. In some implementations, the user may enter the user credential (e.g., username and password) into a prompt displayed in a web browser or another application executing on the client device.

Although implementations are described herein in connection with authenticating a user to grant or deny access to a network resource, the techniques described herein may be used to authenticate a user to grant or deny access to a physical resource, such as a building, a room, a parking lot, or a secure area. In such examples, the user credential and the request to access the resource (e.g., a physical resource) may be transmitted based on a user interaction with a security device (e.g., which may include a lock, a deadbolt, a turnstile, or the like), such as by inputting an access number to the security device (e.g., using a physical or virtual keypad), swiping an access card using the security device (e.g., via a magnetic stripe reader), or moving an access card within communicative proximity of the security device (e.g., for near-field communication).

As further shown in FIG. 1B, and by reference number 135, the authentication system may detect an enhanced security event associated with the request to access the network service. The enhanced security event may be an event that triggers a request for MFA by the authentication system.

In some implementations, the authentication system may detect an enhanced security event based on receiving the user credential and the request to access the network resource from a device other than a user device associated with the user account. In this case, the authentication system may receive the user credential transmitted from the client device and may verify the received user credential based on a comparison with a stored user credential. The authentication system may determine device identifier associated with the user credential. The authentication system may compare a device identifier associated with the client device, from which the user credential is received, to the device identifier associated with the user credential to determine if the client device is the same device as the user device associated with the user account. The authentication system may determine that an enhanced security event has occurred based on determining that the device identifier associated with the client device does not match the device identifier associated with the user credential.

In some implementations, the authentication system may detect an enhanced security event based on receiving a partial user credential from the client device. For example, the enhanced security event may occur when the user forgets the password associated with the user account and requests that the password be reset, or that a new password be issued. In this case, the authentication system may determine that the enhanced security event has occurred based on receiving, from the client device, a partial user credential including the username without the password, together with an indication that the user has forgotten the password. In some implementations, the authentication system may detect an enhanced security event based on detecting a number of incorrect login attempts above a threshold, determining that a threshold amount of time has passed since a previous successful login, determining that the user has requested to change certain account information (e.g., username, password, contact information, or other sensitive information), and/or detecting a request for a financial transaction involving an amount of money above a threshold amount, among other examples.

As further shown in FIG. 1B, and by reference number 140, the authentication system may transmit, to the client device, a request for MFA using the customizable physical security token. In some implementations, the authentication system may transmit the request for MFA based on detecting an enhanced security event. In some implementations, the authentication system may transmit the request for MFA independent of any detection of an enhanced security event. The client device may receive the request for MFA. In some implementations, the client device may display a prompt for the user to perform the MFA using the customizable physical security token. For example, the client device may display a prompt instructing the user to capture an image of the customized physical security token.

As shown in FIG. 1C, and by reference number 145, the client device may capture an image of the customized physical security token. For example, the client device may capture an image of the customized physical security token using a camera of the client device. As shown by reference number 150, the client device may transmit, to the authentication system, the captured image of the customized physical security token. The captured image transmitted to the authentication system in connection with reference number 150 may be referred to herein as the "first image." The image of the customized physical security token transmitted to the authentication system during the registration stage described above in connection with reference number 120 may be referred to herein as the "second image."

As further shown in FIG. 1C, and by reference number 155, the authentication system may compare the received image (e.g., the first image) with the stored authentication information associated with the user account (e.g., the authentication information representing the customized physical security token in the second image). In some implementations, the authentication information may include a representation of the second image, and the authentication system may compare the first image with the representation of the second image to determine whether the first image is an image of the customized physical security token in the second image.

In some implementations, the stored authentication information may include a numerical sequence (e.g., the "second numerical sequence") representing the visual attribute pattern of the customized physical security token in the second image. In this case, the authentication system may determine a first numerical sequence representing a visual attribute pattern in the first image, and the authentication system may compare the first numerical sequence with the second numerical sequence to determine whether the first numerical sequence matches the second numerical sequence. In some implementations, the authentication system may determine that the first numerical sequence matches the second numerical sequence in cases in which the first numerical sequence is identical to the second numerical sequence. In some implementations, the authentication system may determine that the first numerical sequence matches the second numerical sequence if an error between the first numerical sequence and the second numerical sequence satisfies a threshold degree of difference (e.g., is less than the threshold degree of difference, or less than or equal to the threshold degree of difference. In some implementations, the authentication system may perform object detection to detect a candidate physical security token in the first image, and determine the first numerical sequence based on pixel values in a portion of the first image corresponding to the candidate physical security token, as described above in connection with reference number 125. In some implementations, the authentication system may normalize the pixel values in the portion of the first image corresponding to the candidate physical security token and/or perform other image analysis operations described elsewhere herein, prior to determining the first numerical sequence.

In some implementations, the stored authentication information may include the second image. In this case, the authentication system may compare the first image and the second image. In some implementations, the authentication system may calculate a similarity score between the first image and the second image and determine whether the similarity score satisfies a similarity threshold. For example, the similarity score may be a correlation coefficient, a cross-correlation score, or another image-processing-based similarity score. In some implementations, the similarity score may be based on an error measurement, such as a sum squared difference (SSD), mean squared difference (MSD), mean absolute difference (MAD), or another image processing based error measurement, and the authentication system may determine whether the error measurement satisfies an error threshold (e.g., is less than the error threshold, or less than or equal to the error threshold). In some implementations, the authentication system may perform one or more image processing operations on the first image prior to comparing the first image and the second image. For example, the authentication system may perform object detection, pixel normalization, and/or one or more other image processing operations (e.g., cropping, rotation, re-sizing, and/or re-aligning, among other examples), as described elsewhere herein.

In some implementations, the authentication system may compensate for the client device capturing an image of the correct customized physical security token at an incorrect orientation. For example, in some implementations, the customizable physical security token may include markings (e.g., on a border surrounding the grid) that indicate the correct orientation for the customizable physical security token. In this case, the authentication system may detect the markings on the customized physical security token in the first image and determine whether the orientation of the customized physical security token in the first image is correct based on the markings. When the authentication system determines that the orientation of the customized physical security token in the first image is not correct, the authentication system may rotate the first image or a portion of the first image to correct the orientation of the customized physical security token in the first image. In some implementations, the authentication system may compensate for a potentially incorrect orientation of the customized physical security token in the first image by rotating the first image to a number of different orientations and comparing the first image to the second image at each orientation. In some implementations, the authentication system may not compensate for an incorrect orientation of the customized physical security token in the first image. In this case, the orientation of the customized physical security token may provide an additional layer of security, since the user may need possession of the customized physical security token and knowledge of the correct orientation for successful MFA.

As further shown in FIG. 1C, and by reference number 160, the authentication system may transmit an authentication result to the client device based on the comparison. For example, the authentication system may determine, based on the comparison of the first image and the authentication information representing the customized physical security token in the second image, whether to grant or deny the client device access to the network resource. The authentication system may transmit, to the client device, a message indicating whether access to the network resource is granted or denied. For example, the message indicating whether access to the network resource is granted or denied may be delivered from the authentication system to the client device presented in a web browser or other application executing on the client device. If access is granted, then the authentication system may allow the client device to access the requested network resource. If access is denied, then the authentication system may prevent the client device from accessing the requested network resource.

In some implementations, the authentication system may determine whether to grant or deny the client device access to the network resource based on the comparison of the first image and the authentication information representing the customized physical security token in the second image and based on receiving, from the client device, an indication originating from the physical security token confirming physical presence of the physical security token. In some implementations, the physical security token may include a radio-frequency identification (RFID) tag, and the indication confirming physical presence may include an identifier associated with the RFID tag. In this case, the client device may receive, from the RFID tag (e.g., via near field communication), the identifier associated with the RFID tag. For example, the client device may receive the identifier associated with the RFID tag in response to physically tapping the customized physical security token. The client device may transmit the identifier associated with the RFID tag of the customized physical security token to the authentication system along with the first image. The authentication system may compare the received identifier with a stored RFID tag identifier in the authentication information to confirm the physical presence of the customized physical security token.

In some implementations, the physical security token may include a power source (e.g., a battery) and an antenna for communicating via a personal area network, such as Bluetooth. The customizable physical security token may generate a digital key when the customizable physical security token is initially customized. For example, the digital key may be a numeric or binary sequence associated with the customized physical security token. During initial registration of the customized physical security token, the client device may receive the digital key from the customized physical security token and transmit the digital key to the authentication system. The authentication system may store the digital key in the authentication information. During MFA, the client device may pair with the customized physical security token via the personal area network and receive the digital key from the customized physical security token based on pairing with the customized physical security token. The client device may transmit the digital key to the authentication system, and the authentication system may compare the newly received digital key with the stored digital key to confirm the physical presence of the customized physical security token.

Although implementations are described herein in connection with user customization of the physical security token, storing authentication information relating to the customized physical security token, and performing MFA based on the authentication information relating to the customized physical security token, the customizable physical security token described herein may be used for interactive MFA based on customizing the customizable physical security token to match a visual attribute pattern generated by the authentication system. For example, in some implementations, the authentication system may generate an authentication pattern based on receiving a user credential and a request to access a network resource from the client device. The authentication pattern may be a visual attribute pattern, such as a color pattern, for the slots of the customizable physical security token. For example, the authentication system may randomly generate the authentication pattern. The authentication system may transmit, to the client device, instructions for re-creating the authentication pattern and/or an image of the authentication pattern. The client device may display the instructions and/or image in a user interface, and the user may customize the customizable physical security token to re-create the authentication pattern. The client device may capture an image of the customizable physical security token and transmit the image of the customized physical security token to the authentication system. The authentication system may compare the visual attribute pattern in the image of the customized physical security token with the authentication pattern and determine whether to grant or deny access to the network resource based on the comparison.

Although implementations are described herein in connection with multi-factor authentication using the customizable physical security token together with a login credential for MFA, in some implementations, the customizable physical security token may be used for authentication or identification verification without MFA. For example, in some implementations, a user may customize and register a customizable physical security token, and then customized physical security token may be used in place of a login credential to verify the identity of the user.

Using the techniques described herein, MFA can be provided using a customizable physical security token, without using complicated MFA techniques that may be difficult for users to use correctly. Furthermore, the customizable physical security token is difficult to replicate by adverse parties and/or describe verbally by the user. In this way, vulnerability to spoofing and/or man-in-the-middle attacks may be reduced, and security may be enhanced.

As indicated above, FIGS. 1A-1C are provided as an example. Other examples may differ from what is described with regard to FIGS. 1A-1C.

FIG. 2 is a diagram of an example environment 200 in which systems and/or methods described herein may be implemented. As shown in FIG. 2, environment 200 may include a client device 210, an authentication system 220, and a network 230. Devices of environment 200 may interconnect via wired connections, wireless connections, or a combination of wired and wireless connections.

The client device 210 includes one or more devices capable of receiving, generating, storing, processing, and/or providing information associated with MFA using a customizable physical security token, as described elsewhere herein. The client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The authentication system 220 includes one or more devices capable of receiving, generating, storing, processing, providing, and/or routing information associated with MFA using a customizable physical security token, as described elsewhere herein. The authentication system 220 may include a communication device and/or a computing device. In some implementations, the authentication system 220 includes a server device. For example, the authentication system 220 may include a server, such as an application server, a client server, a web server, a database server, a host server, a proxy server, a virtual server (e.g., executing on computing hardware), or a server in a cloud computing system. In some implementations, the authentication system 220 includes computing hardware used in a cloud computing environment.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
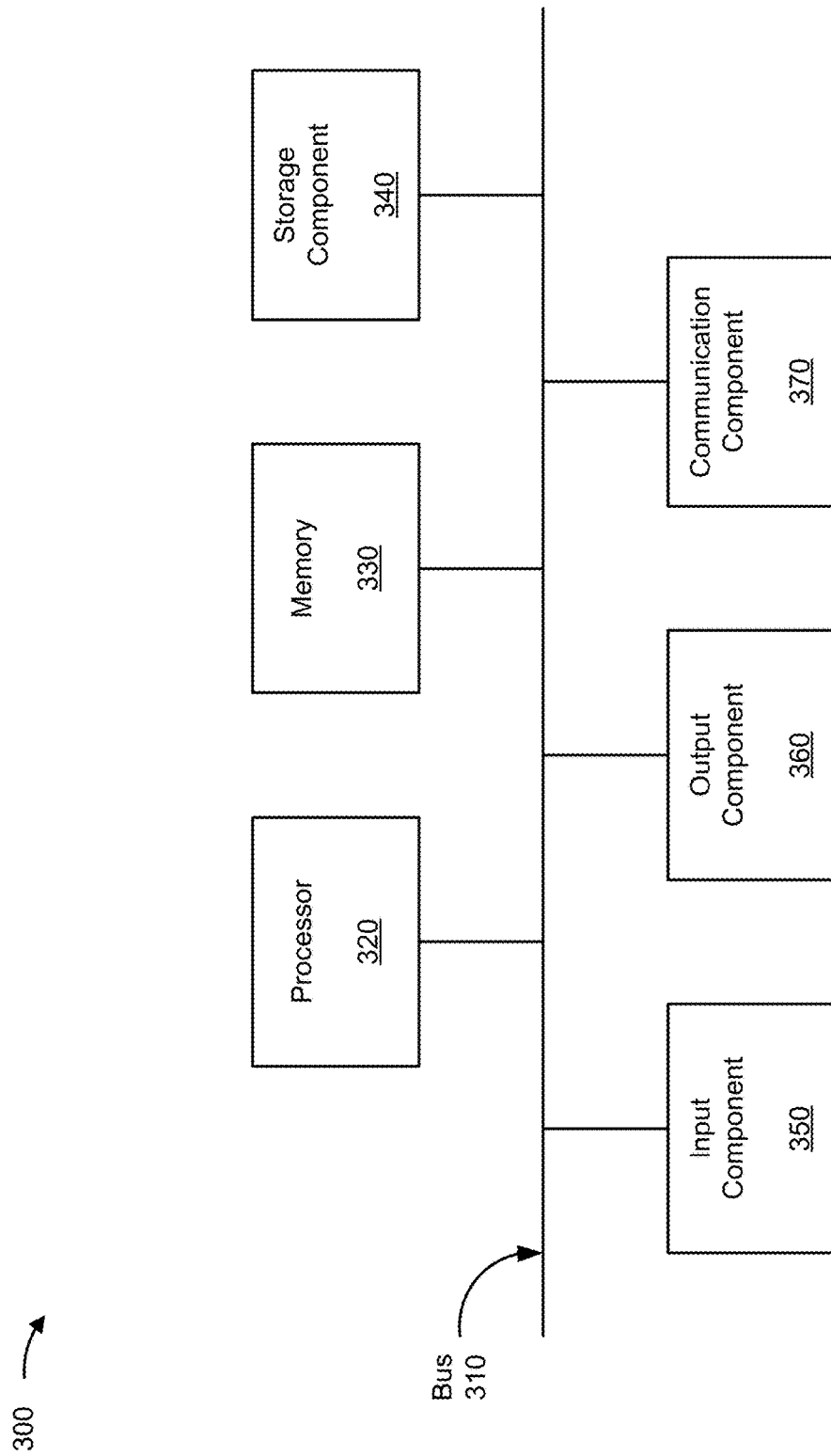
FIG. 3 is a diagram of example components of one or more devices of FIG. 2.

FIG. 3 is a diagram of example components of a device 300, which may correspond to the client device 210 and/or the authentication system 220. In some implementations, the client device 210 and/or the authentication system 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
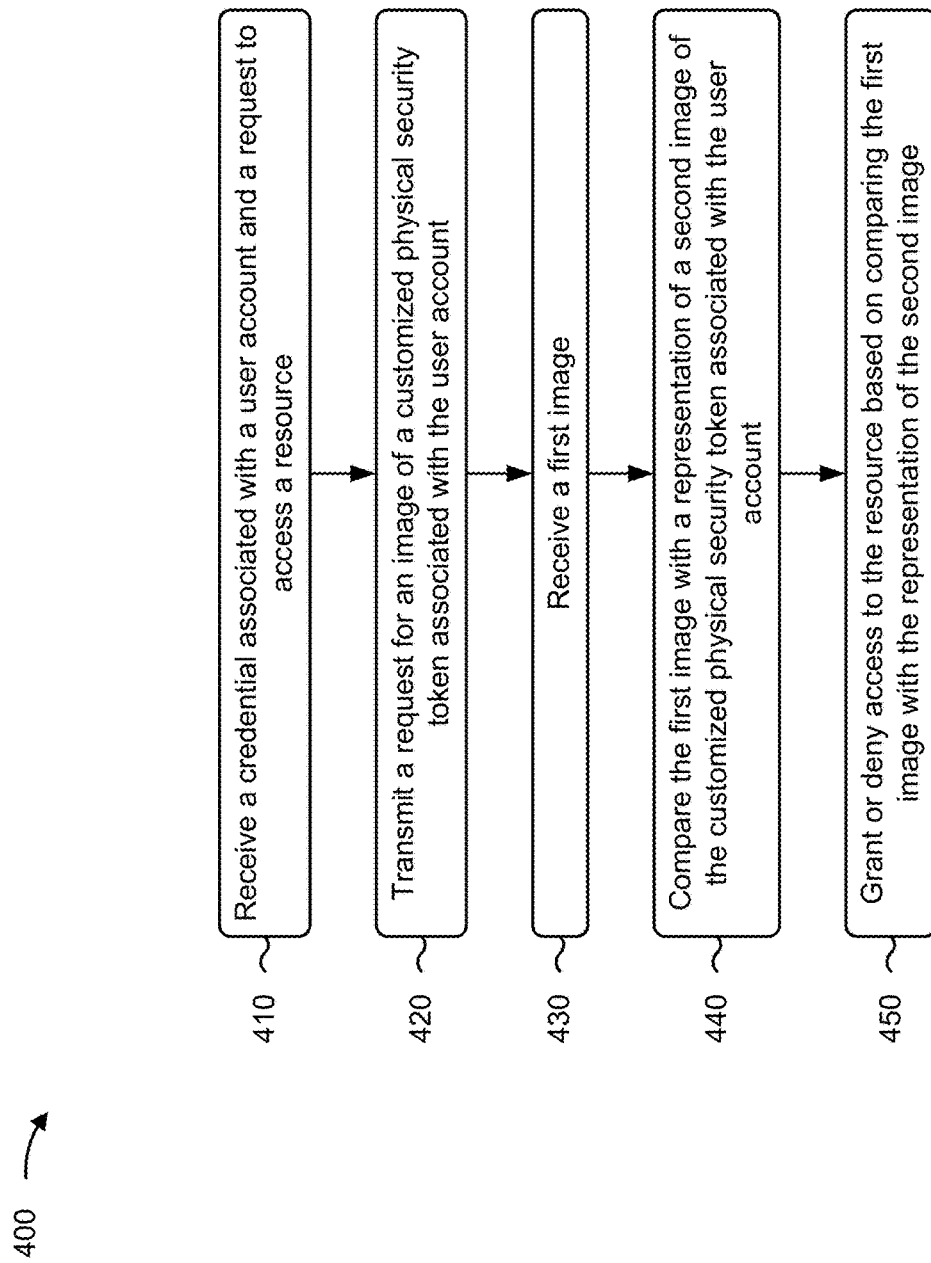
FIGS. 4 and 5 are flowcharts of example processes relating to multi-factor authentication using a customizable physical security token.

FIG. 4 is a flowchart of an example process 400 associated with MFA using a customizable physical security token. In some implementations, one or more process blocks of FIG. 4 may be performed by an authentication system (e.g., authentication system 220). In some implementations, one or more process blocks of FIG. 4 may be performed by another device or a group of devices separate from or including the authentication system 220, such as the client device 210. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a client device, a credential associated with a user account and a request to access a resource (block 410). As further shown in FIG. 4, process 400 may include transmitting, to the client device, a request for an image of a customized physical security token associated with the user account (block 420). As further shown in FIG. 4, process 400 may include receiving, from the client device, a first image (block 430). As further shown in FIG. 4, process 400 may include comparing the first image with a representation of a second image of the customized physical security token associated with the user account (block 440). As further shown in FIG. 4, process 400 may include granting or denying access to the resource based on comparing the first image with the representation of the second image (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
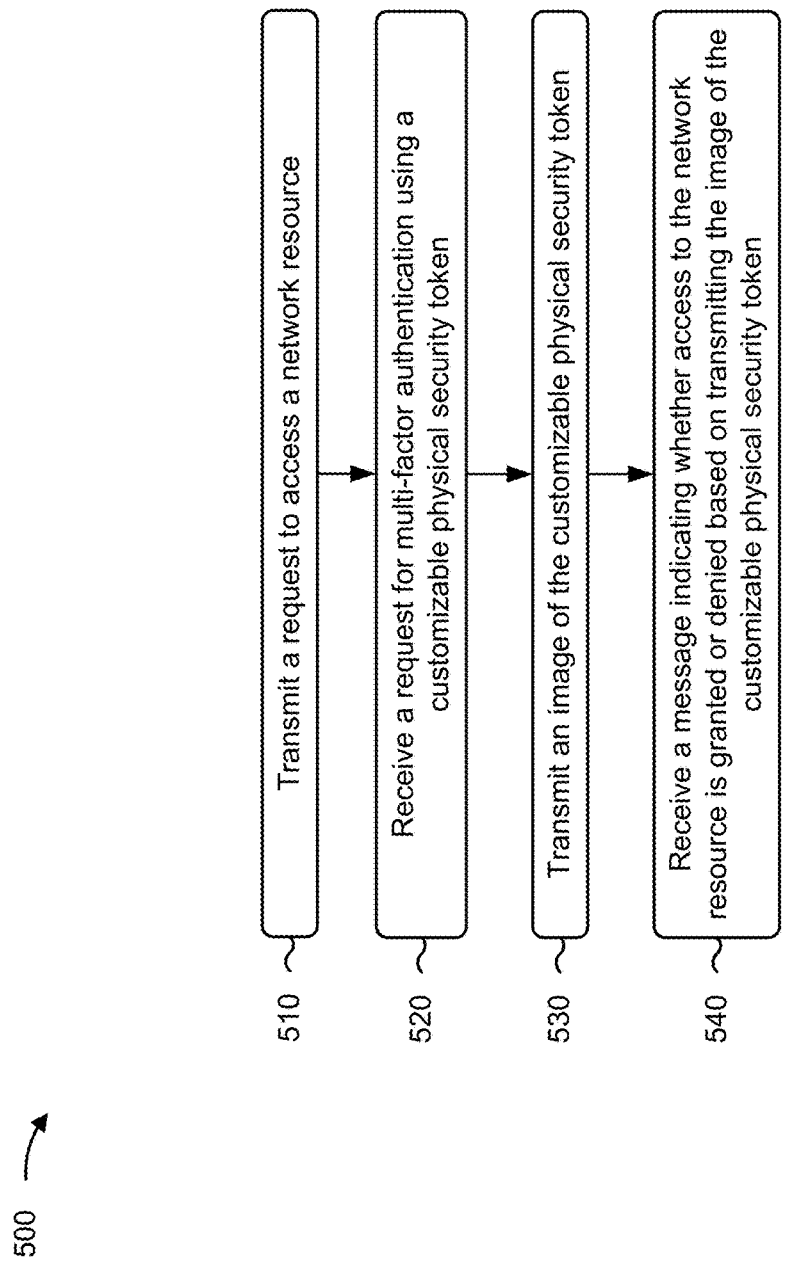

FIG. 5 is a flowchart of an example process 500 associated with MFA using a customizable physical security token. In some implementations, one or more process blocks of FIG. 5 may be performed by a client device (e.g., client device 210). In some implementations, one or more process blocks of FIG. 5 may be performed by another device or a group of devices separate from or including the client device 210, such as the authentication system 220. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include transmitting, to a server device, a request to access a network resource (block 510). As further shown in FIG. 5, process 500 may include receiving, from the server device and based on transmitting the request, a request for multi-factor authentication using a customizable physical security token (block 520). As further shown in FIG. 5, process 500 may include transmitting, to the server device, an image of the customizable physical security token (block 530). In some implementations, the customizable physical security token includes a grid having slots with customizable visual attributes. As further shown in FIG. 5, process 500 may include receiving, from the server device, a message indicating whether the access to the network resource is granted or denied based on transmitting the image of the customizable physical security token (block 540).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   transmitting, by a system and based on receiving a request for an image of a customizable physical security token, a first image of the customizable physical security token,
      wherein the customizable physical security token includes a grid having slots with customizable visual attributes;
   obtaining, by the system, a digital key associated with the customizable physical security token based on a device, of the system, pairing with the customizable physical security token via a personal area network;
   transmitting, by the system, the digital key based on the device pairing with the customizable physical security token via the personal area network; and
   performing, by the system, an action associated with a resource based on a comparison of the first image with a representation of a second image and based on a determination of whether the digital key matches a stored digital key.

2. The method of claim 1, wherein obtaining the digital key comprises:
   obtaining the digital key based on using Bluetooth.

3. The method of claim 1, further comprising:
   obtaining instructions for re-creating an authentication pattern using the customizable physical security token; and
   capturing the first image of the customizable physical security token based on obtaining the instructions for re-creating the authentication pattern.

4. The method of claim 1, wherein the customizable physical security token comprises one or more objects in one or more slots, of the slots, to customize visual attributes for the slots.

5. The method of claim 1, wherein the customizable physical security token comprises a locking mechanism to lock a customized pattern using the slots into place.

6. The method of claim 1, wherein the request for the image of the customizable physical security token is based on detection of an enhanced security event.

7. The method of claim 1, wherein transmitting the first image of the customizable physical security token is associated with a request associated with another device, of the system, to access the resource.

8. A system, comprising:
one or more memories; and
one or more processors, coupled to the one or more memories, configured to:
receive, based on transmitting a request for an image of a customizable physical security token, a first image of the customizable physical security token,
wherein the customizable physical security token includes a grid having slots with customizable visual attributes;
obtain a digital key associated with the customizable physical security token based on a device pairing with the customizable physical security token via a personal area network;
compare the first image with a representation of a second image and based on a determination of whether the digital key matches a stored digital key; and
perform an action associated with granting or denying access to a resource based on a comparison of the first image with a representation of a second image and based on a determination of whether the digital key matches a stored digital key.

9. The system of claim 8, wherein the digital key is obtained using Bluetooth.

10. The system of claim 8, wherein the one or more processors are further configured to:
transmit instructions for re-creating an authentication pattern using the customizable physical security token; and
receive the first image of the customizable physical security token based on obtaining the instructions for re-creating the authentication pattern.

11. The system of claim 8, wherein the customizable physical security token comprises one or more objects in one or more slots, of the slots, to customize visual attributes for the slots.

12. The system of claim 8, wherein the customizable physical security token comprises a locking mechanism to lock a customized pattern using the slots into place.

13. The system of claim 8, wherein the request for the image of the customizable physical security token is based on detection of an enhanced security event.

14. The system of claim 8, wherein receiving the first image of the customizable physical security token is associated with a request to access the resource.

15. A non-transitory computer-readable medium storing a set of instructions, the set of instructions comprising:
one or more instructions that, when executed by one or more processors of a device, cause the device to:
transmit, based on receiving a request for an image of a customizable physical security token, a first image of the customizable physical security token,
wherein the customizable physical security token includes a grid having slots with customizable visual attributes;
obtain a digital key associated with the customizable physical security token based on the device pairing with the customizable physical security token via a personal area network;
transmit the digital key based on the device pairing with the customizable physical security token via the personal area network; and
perform an action associated with access to a resource based on a comparison of the first image with a representation of a second image and based on a determination of whether the digital key matches a stored digital key.

16. The non-transitory computer-readable medium of claim 15, wherein the one or more instructions, that cause the device to obtain the digital key, cause the device to:
obtain the digital key based on using Bluetooth.

17. The non-transitory computer-readable medium of claim 15, wherein the one or more instructions further cause the device to:
obtain instructions for re-creating an authentication pattern using the customizable physical security token; and
capture the first image of the customizable physical security token based on obtaining the instructions for re-creating the authentication pattern.

18. The non-transitory computer-readable medium of claim 15, wherein the customizable physical security token comprises one or more objects in one or more slots, of the slots, to customize visual attributes for the slots.

19. The non-transitory computer-readable medium of claim 15, wherein the customizable physical security token comprises a locking mechanism to lock a customized pattern using the slots into place.

20. The non-transitory computer-readable medium of claim 15, wherein the request for the image of the customizable physical security token is based on detection of an enhanced security event.

* * * * *